United States Patent
Shou et al.

[19]

[11] Patent Number: 5,974,038
[45] Date of Patent: Oct. 26, 1999

[54] RECEIVER FOR CODE DIVISION MULTIPLE ACCESS COMMUNICATION SYSTEM

[75] Inventors: Guoliang Shou; Changming Zhou; Xuping Zhou; Makoto Yamamoto; Sunao Takatori, all of Tokyo, Japan

[73] Assignee: Yozan, Inc., Tokyo, Japan

[21] Appl. No.: 08/864,784

[22] Filed: May 29, 1997

[30] Foreign Application Priority Data

May 29, 1996 [JP] Japan ................................. 8-156370

[51] Int. Cl.$^6$ .................................................. H04B 7/216
[52] U.S. Cl. ........................ 370/335; 370/342; 370/320; 375/207
[58] Field of Search ..................................... 375/207, 343, 375/200, 209, 210, 208; 370/335, 341, 342, 320, 311; 455/38.3, 38.2

[56] References Cited

U.S. PATENT DOCUMENTS

| | | | |
|---|---|---|---|
| 5,267,264 | 11/1993 | Shlenker et al. | 375/13 |
| 5,293,398 | 3/1994 | Hamao et al. | 375/1 |
| 5,297,171 | 3/1994 | Koch | 375/100 |
| 5,309,482 | 5/1994 | Wright et al. | 375/103 |
| 5,345,469 | 9/1994 | Fulghum | 375/1 |
| 5,627,855 | 5/1997 | Davidovici | 375/207 |
| 5,764,691 | 6/1998 | Hennedy et al. | 375/207 |

OTHER PUBLICATIONS

Simon, Marvin K. et al., "Spread Spectrum Communications Handbook", McGraw–Hill, Inc., 1994, p. 766 and p. 818.
Dixon, Robert C., "Spread Spectrum System With Commercial Applications", Third Edition, John Wiley & Sons, Inc., 1994, p. 237 and p. 259.
Yokoyama, Mitsuo, "Spread Spectrum Communication System", Kagaku Gijutsu Shuppansha, 1998, p. 301.

*Primary Examiner*—Ajit Patel
*Assistant Examiner*—Brian Nguyen
*Attorney, Agent, or Firm*—Pillsbury Madison & Sutro LLP

[57] ABSTRACT

This invention reduces electric power consumption of a CDMA communication system receiver while it is in the wait mode. A received spread spectrum signal is demodulated in multiplication means into baseband signals Ri and Rq, and inputted into a complex matched filter. This filter is intermittently driven by supply voltage control means to perform acquisition of received signals. When an electric power calculation circuit detects the output of the filter to reach a peak equal to or greater than a predetermined value, the received signals undergo acquisition by controlling n number of correlators 26-1 to 26-n to work by a correlator controlling circuit. Moreover, de-spreading is performed. The outputs from each correlator 46-1 to 26-n are given to a RAKE combiner and demodulated by the RAKE by a combining and demodulating circuit.

5 Claims, 9 Drawing Sheets

RECEIVER FOR CODE DIVISION MULTIPLE ACCESS COMMUNICATION SYSTEM

FIELD OF THE INVENTION

The present invention relates to a receiver suitable for use in a CDMA mobile communication system.

BACKGROUND OF THE INVENTION

There are two systems in spread spectrum modulation, direct sequence and frequency hopping (respectively, SS, DS and FH, hereinafter). Both systems have good characteristics not only of communication secrecy but also strength against jamming, narrow band interference, and multipath fading. Recently, in the field of wireless transmission, the CDMA (Code Division Multiple Access) mobile communication system using SS modulation has gained wide notice.

As radio waves are transmitted by dispersing transmission electricity to lower electric density in the SS system, high-speed acquisition is important for the object signal when receiving an SS signal. Acquisition means adjusting the timing of the receiving system to that of the transmitted signals. There are two types of acquisition, "obtaining acquisition" (acquisition, hereinafter), the state of unobtained acquisition at the initial communication, and "tracking acquisition" (tracking hereinafter), that watches acquisition so as not to lose it by modulation and noise.

DS acquisition means the work from presuming the timings of spreading code generation of transmitted signals and of its preparation in the receiver with the accuracy, for example, within one chip, to starting the action of spread spectrum generator of the receiver at the same timings.

The methods for performing acquisition are i) using a sliding correlator, and ii) using a matched filler.

In method i), spreading codes are generated in the receiver at roughly estimated timing,. and acquisition is attempted by gradual phase shifting of spreading codes. The received signals and spreading codes generated in the receiver are accumulated and passed through a low-pass filter. When the phase of spreading code sequence including the received signals coincides with that being generated in the receiver, a large amplification signal is obtained at the output of the low-pass filter. When the phases do not coincide, the signal is low-level as given by auto-correlation function of the spreading code sequence. Therefore, when the low-pass filter output is equal to or below the predetermined level, the phase of spreading code sequence generated by the spreading code generator is a little advanced or delayed. The spreading code sequence phase of received signals and that generated in the receiver coincide by repeating the above processing.

By this method, the phases can be made to coincide by shifting the phase of the spreading code generator in most instances corresponding to one cycle of spreading code sequence. When the spreading code generator works in a given phase, one cycle's span of spreading code sequence is necessary to investigate whether that phase is adequate or not. Therefore, this method requires one cycle's spreading code sequence time X the spreading code sequence length to complete the acquisition.

Method ii) soon detects correlation value, allowing acquisition to be completed at once. When SS modulation signals are successively input from the receiving side of a matched filter, the phase value at every moment appears at the output. Therefore, the peak of correlation can be detected by observing the outputs of the matched filter during the time of one cycle of spreading codes. With this method, the acquisition can be completed in the time corresponding to one cycle of spreading codes.

When the acquisition is completed, watching and correcting it are necessary so as not to lose its location caused by the influence of modulation and noise. This is tracking, for which a DLL (Delay Locked Loop) circuit is usually used. This tracking circuit includes two sets of correlators: each correlator de-spreads the received signals with different phase shifted sequence of the same spreading code, for example, that is a half-chip advanced and half-chip delayed than those used in active de-spreading, and the difference of outputs of the correlators is calculated after passing through envelope detecting circuit. An S-shaped correlation output can be obtained by it. Acquisition is performed by controlling through feeding back the phase of spreading codes generated in the receiver using the S-shaped correlation output.

In mobile radio communication, multipath fading is generated because the signals transmitted from the base station reach a receiver through a plurality of transmission routes with different route lengths of which are not added coherently. As an effective countermeasure against such multipath fading, the RAKE receiving method using a direct spread spectrum signal realizes path-diversity by distinguishing the signals taking multiple paths, adding weight of reliance, and combining.

SUMMARY OF THE INVENTION

When the CDMA system is adopted in a mobile telephone, the mobile system receiver must perform the acquisition in the wait mode.

As mentioned above, acquisition using a sliding correlator in i) needs considerable time to complete acquisition although electric power consumption is low. Consequently, power consumption is high when acquisition is performed. On the other hand, acquisition using a matched filter in ii) requires heavy power consumption because the matched filter itself requires it, although the acquisition time is short.

One object of the present invention is to provide a receiver for a CDMA communication system which reduces power consumption in the wait mode and performs acquisition in a short time.

Another object is to provide a receiver for a CDMA communication system capable of receiving a good quality signal even when multipath fading is generated.

To accomplish the above objects, a receiver for a CDMA communication system according to the present invention comprises i) a matched filter for performing acquisition of received spread spectrum signals; ii) a correlator having a de-spreading means and a delay lock loop for acquisition, both for the received spread spectrum signals, iii) a supply voltage control means for intermittently supplying voltage to the matched filter; and iv) a means for controlling the correlator to start it when the received signals are undergoing acquisition while the matched filter works.

Another receiver for a CDMA communication system according to the present invention comprises i) a matched filter for performing acquisition of received spread spectrum signals; ii) a plurality of correlator parallelly set having de-spreading means and delay lock loops for acquisition, both for the received spread spectrum signals, iii) a supply voltage control means for intermittently supplying voltage to the matched filter; iv) a means to control the operation of the plurality of correlator according to the output of the matched filter to start it when the received signals are undergoing acquisition while the matched filter works; simultaneously, the phase of spreading code sequence generated in each correlator according to the peak output level of the matched filter is controlled; and v) a watching means for controlling the matched filter to start operation corresponding to the output signal level from the plurality of correlator.

The watching means controls the matched filter to start operation when the electric power outputted from the plurality of correlators is lower than a predetermined value, and when the electric power outputted from the plurality of correlators is lower than a predetermined value during a period longer than a predetermined one.

The cycle to supply voltage to the matched filter by the supply voltage control means is changeable.

The matched filter comprises i) a plurality of sampling and holding circuits; ii) a plurality of multiplication circuits outputting signals from each sampling and holding circuit to the first or second output terminal according to the bit value corresponding to a spreading code sequence; iii) the first analog addition circuit for adding signals of the first output terminal of each multiplication circuits; iv) the second analog addition circuit for adding signals of the second output terminal of each multiplication means; and v) the third analog addition circuit for performing subtraction between the outputs of the first and second analog addition circuits.

It is possible to reduce power consumption in the wait mode, and to complete acquisition in a short time because the matched filter for performing acquisition works intermittently, and the correlator tracks and receives signals after acquisition is performed.

It is also possible to clearly receive signals during multipath fading by setting a plurality of correlators to receive signals with the RAKE combining system.

When a matched filter including a sampling and holding circuit and a, multiplier and analog adder are used, electric power consumption can be significantly reduced.

PREFERRED EMBODIMENT OF THE PRESENT INVENTION

Before explaining a CDMA communication system receiver according To the present invention, an example of a spread spectrum signal transmission to the receiver is explained with reference to FIG. 7. In this example, the transmitted data is spread and modulated by a spreading code, the spread and modulated signal undergoes QPSK (quadrature PSK) modulation, and is then transmitted.

Figure 7:
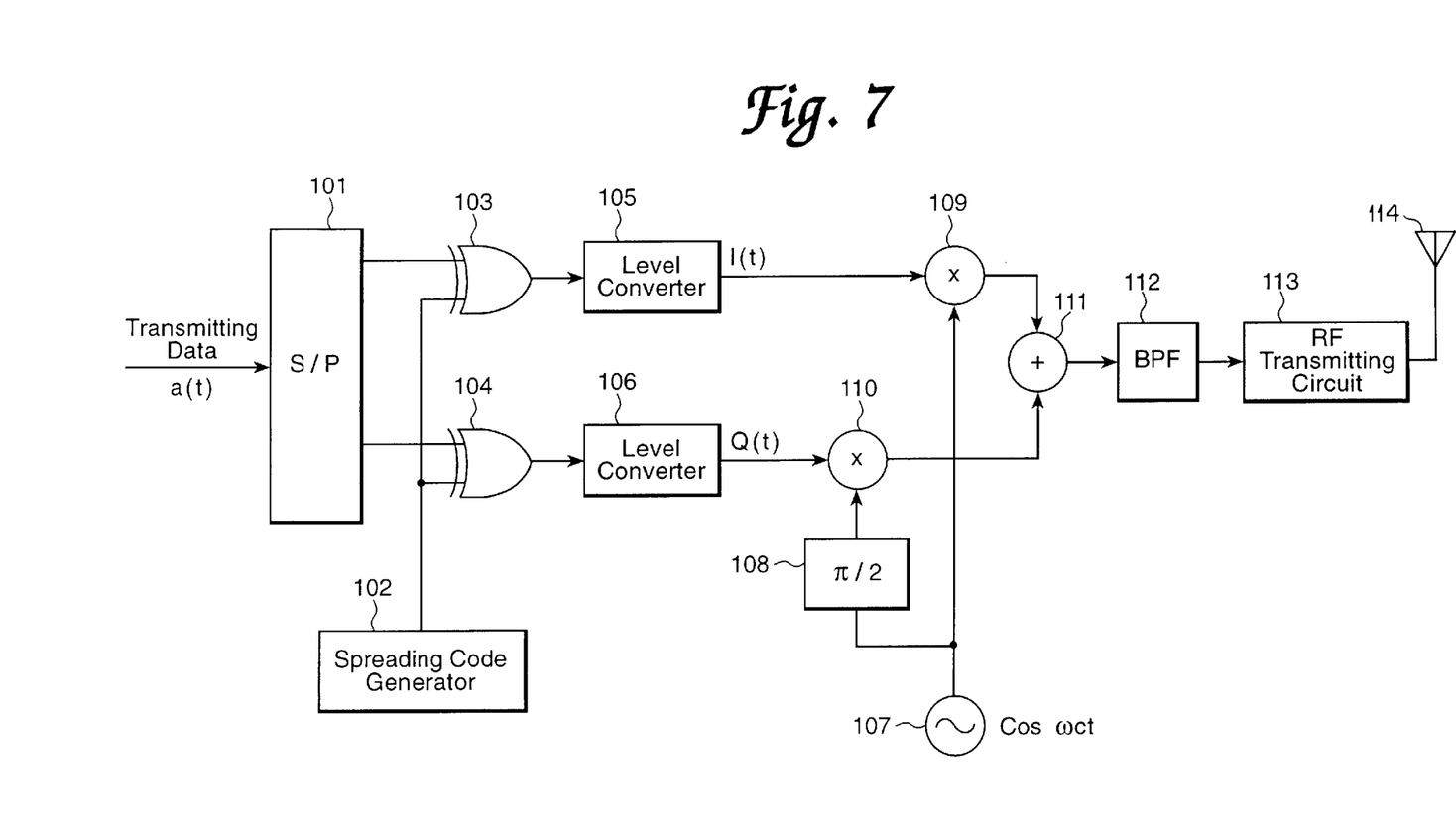
FIG. 7 shows an example of the structure of a transmitter.

In FIG. 7, transmitted data a(t) is converted into two types of signals by serial-to-parallel converter 101, and each is inputted into an exclusive-OR operating circuits 103 and 104. In both 103 and 104, exclusive-OR is operated on an output signal of serial-to-parallel converter 101 and a PN code sequence is generated in spreading code generator 102 or a spreading code sequence such as Gold code sequence, then, spreading modulation is performed. The signal sequences performed on the spread modulation output from exclusive-OR operating circuits 103 and 104 are respectively input to level converting circuits 105 and 106 in which the level is respectively converted from "0" into "−1" and from "1" into "+1". The output of level converter 105 becomes in-phase component. I(t), and the output of level converter 106 becomes quadrature component Q(t).

In-phase component I(t) is input to multiplication means 109 and multiplied by signal cos $\omega_c t$ generated by oscillator 107. Quadrature component Q(t) is inputted into a multiplication circuit 110 and multiplied by output signal sin $\Omega_c t$ of common shift circuit 108 for shifting the output signal phase of oscillator 107 by $\pi/2$. Outputs of multiplication circuits 109 and 110 are added in adder 111, input to RF sending circuit 113 through band-pass filter 112, and transmitted from transmitting antenna 114 after converting into the predetermined frequency band.

In the above structure, a QPSK signal is transmitted after frequency conversion occurs in RP transmitter 113, but it is not limited to this structure. A signal with transmitting frequency can also be generated in oscillator 107.

Figure 1:
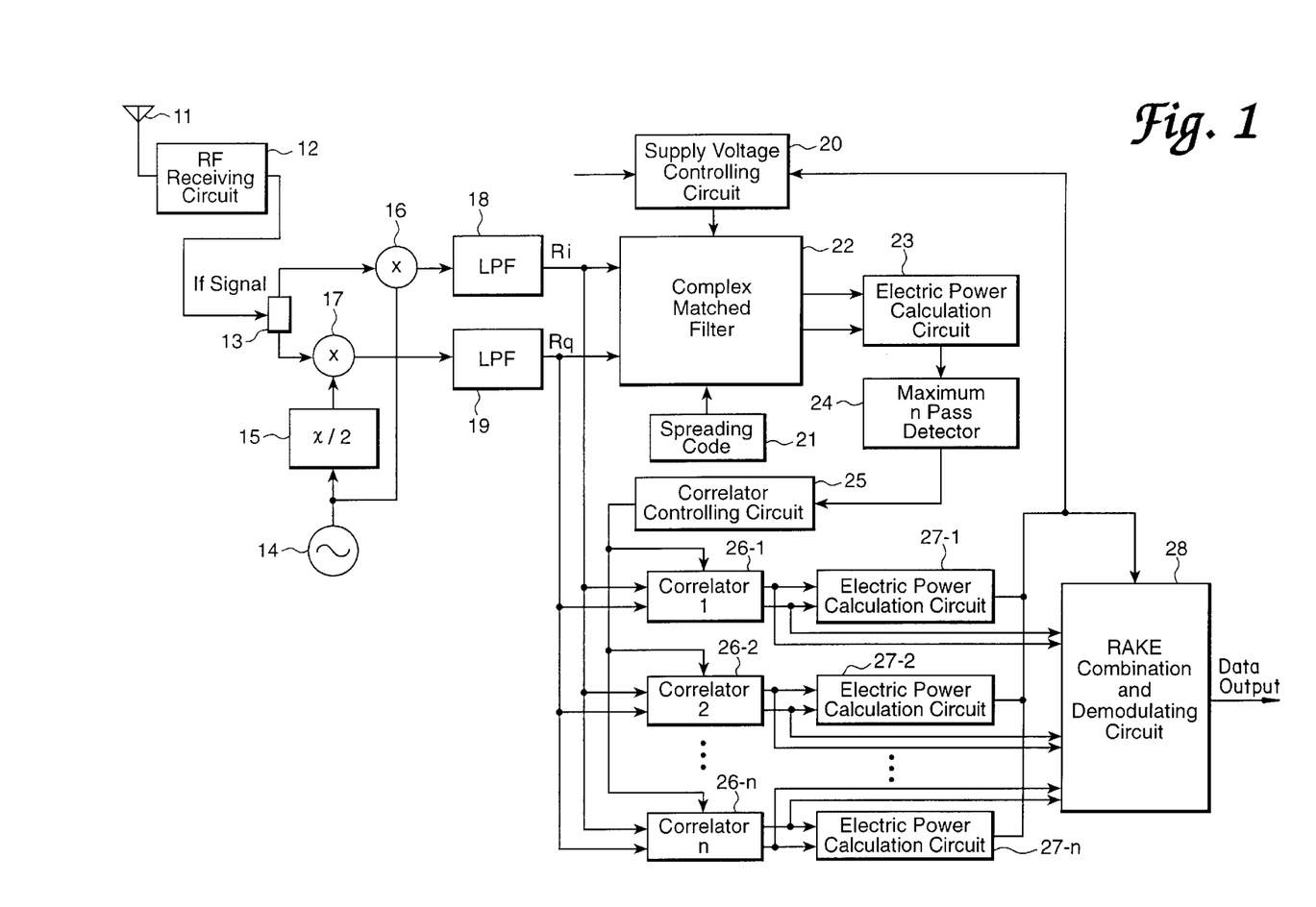
FIG. 1 shows a block diagram of an embodiment of a receiver for a CDMA communication system of the present invention.

FIG. 1 shows the structure of the first embodiment of a CDMA communication system receiver of the present invention for receiving transmitted signals.

In FIG. 1, a spread spectrum signal received by antenna 11 is converted into an intermediate frequency signal by a radio-frequency receiving circuit 12, divided into two types of signals in a distributor 13, and supplied to multiplication circuits 16 and 17. Circuit 14, an oscillator for generating a intermediate-frequency signal (cos $\Omega_c t$), has its output directly sent to the multiplication circuit 16 and simultaneously inputted into the multiplication circuit 17 through a phase-shifting circuit 15, which shifts a phase by $\pi/2$. In the multiplication circuit 16, the intermediate-frequency signal from the distributor 13 and the oscillation output from 14 are multiplied. The result of the multiplication is inputted into a low-pass filter (LPF) 18, and a baseband signal in-phase component Ri in common mode is outputted. In the multiplication circuit 17, the middle frequency signal from distributor 13 and the output of phase-shifting circuit 15 (sin $\omega_c t$) are multiplied, and a baseband signal quadrature component Rq is outputted from LPF19.

Baseband signals Ri and Rq from LPF18 and LPF19 are inputted into a complex matched filter 22 in which two types of matched filters for in-phase component and for quadrature component, perform the acquisition using the spreading code sequence generated by spreading code generator 21. A supply voltage controlling circuit 20 applies voltage intermittently to the complex matched filter 22 when there is no output from the electric power calculation circuits 27-1 to 27-n, and does not apply voltage when there is one or more outputs from 27-1 to 27-n. The complex matched filter, 22 is driven for enough time to detect peaks in correlation value with the predetermined time intervals in the wait mode. Although a matched filter with high electric power consumption is used for acquisition in the receiver of the present invention, power consumption as a whole can be restricted because it works intermittently.

Figure 4:
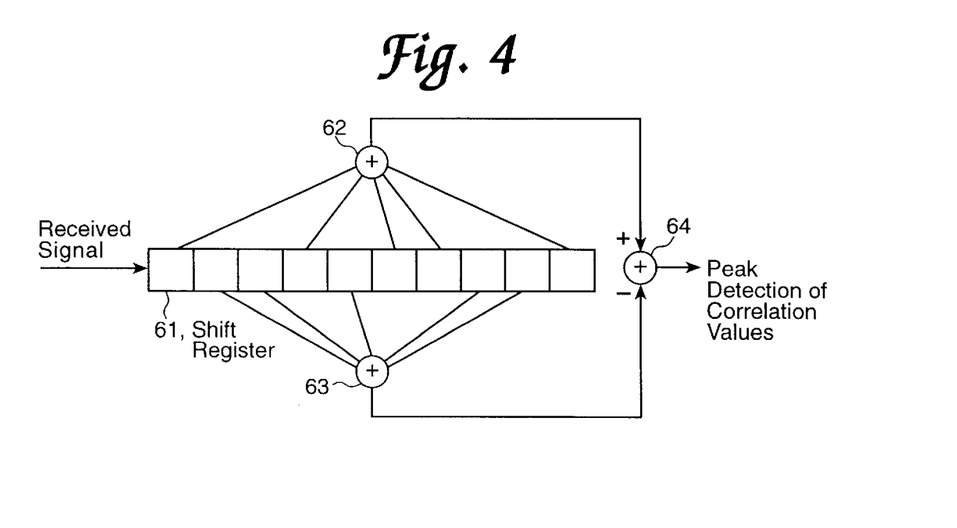
FIG. 4 shows the structure of a matched filter.

The matched filter in the complex matched filter 22 contains a CCD (Charge-Coupled Device), SAW (Surface Acoustic Wave) filter, or digital IC circuit. Acquisition performed in the complex matched filter 22 is explained with reference to FIG. 4. In FIG. 4, when a received signal Ri or Rq, having undergone previous spread spectrum modulation, is inputted into a shift register 61 which comprises a delay line with taps, it is shifted to the right one by one. Then, the signals top reaches the right end of the shift register 61 when one cycle signal of the spreading code sequence is inputted. Here, the output of each tap of the shift register 61 is appropriately added and taken out as shown.

The tap group outputs that are taken out above and below coincide with the patterns of "0" and "1" in the spreading code sequence of an object signal. That is, the tap outputs corresponding to the bit locations of "1" in the objective spreading code sequence are taken out above, and those corresponding to the bit locations of "0" are taken out below. By subtracting in an adder 64 the summation result of tap outputs that are taken out below, which is performed in adder 63, from the summation result of tap outputs taken out above, which is performed in adder 62, the correlation value between the signal under the receiving and objective spreading code sequence can be outputted from adder 64. When signals having undergone spread spectrum modulation successively arrive in that state at the input end of shift register 61, the correlation value at any moment is successively outputted from adder 64. Observing the outputs through one cycle of spreading code sequence, the correlation value peak can be found.

Figure 5:
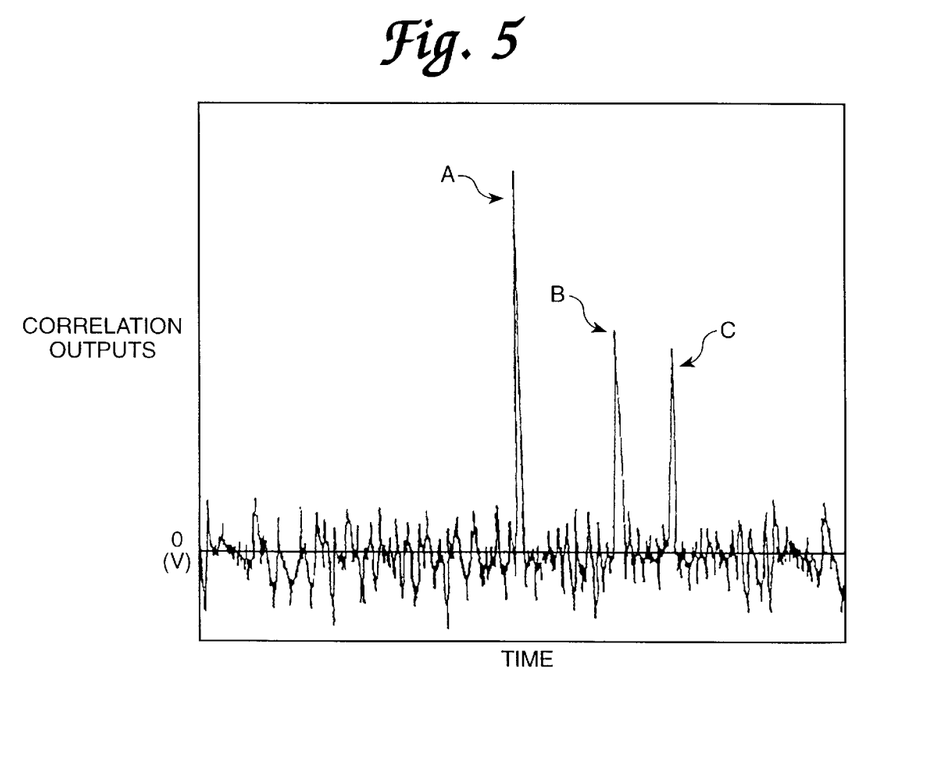
FIG. 5 shows an example of correlation outputs.

FIG. 5 shows an example of correlation outputs from the matched filter. Ideally, only one peak appears as the correlation outputs of the received signal and the spreading code sequence. Actually, signals from a transmitter arrive not only directly at an antenna (direct wave) but also through reflection of buildings and the ground (reflected wave); therefore, signals arrive at antenna 11 through multipath. As these signals are received with a delay time corresponding to the route, a plurality of correlation peaks appear as shown in FIG. 5. In FIG. 5, A represents the correlation peak by the direct wave, and B and C respectively show correlation peaks of the first and second delay waves.

When such signals arrive through a plurality of routes, multipath fading is generated because received signals interfere with one another. In this embodiment, path-diversity reception is performed by parallelly setting n number of correlators (de-spreading circuits) 26-1 to 26-n as described later and performing a RAKE combination on the output from each of the de-spreading circuits.

The correlation output from complex matched filter 22 is inputted into an electric power calculation circuit block 23 to detect the amount. By calculating electric power, when a correlation peak output larger than the predetermined value is detected, an output signal is outputted in the path detector 24 by recognizing a spread spectrum modulation signal which the receiver should receive. Path detector 24 detects the phase offset corresponding to a path of wave and a transmission delay time of each path using correlation outputs from the electric power calculation circuit block 23. In this embodiment, at most n number of paths can be detected.

An output from 24 is inputted into the to correlator controlling circuit 25 which starts the operation of correlators corresponding to the number of paths in 26-1 to 26-n detected according to the outputs from the path detector 24 by supplying the baseband signal Ri, Rq and the supply voltage, simultaneously. The phase of the spreading code sequence generated by the spreading code generator in each correlator is controlled according to the phase offset of the corresponding path. Consequently, at most n number of paths are detected in 24, the phase of spreading code sequence used for de-spreading is controlled in 26-1 to 26-n according to phase offset of detected paths, and 26-1 to 26-n parallelly performs de-spread on received signals of corresponding paths.

To each of the n number of correlators 26-1 to 26-n parallelly set, both output signals Ri from the LPF18 and Rq from the LPF19 are inputted. De-spreading is performed in each correlator 26-1 to 26-n, whose detailed structure is described later. Modulating data of components "i" and "q" outputted from each correlator 26-1 to 26-n are inputted into the RAKE combining and demodulating circuit 28, and sent to the electric power calculation circuit blocks 27-1 to 27-n. In 27-1 to 27-n, electric power for receiving signal corresponding to each path is calculated and the calculation result is inputted into the RAKE combining and demodulating circuit 28 so as to be used as a weight coefficient for the RAKE combining, and inputted into the supply voltage controlling circuit 20. In the RAKE combining and demodulating circuit 28, the data after de-spreading corresponding to each pass from the correlators 26-1 to 26-n is composed using a weight coefficient determined according to the outputs of the electric power calculating circuit 27-1 to 27-n, demodulated into serial data, and then outputted.

Figure 2:
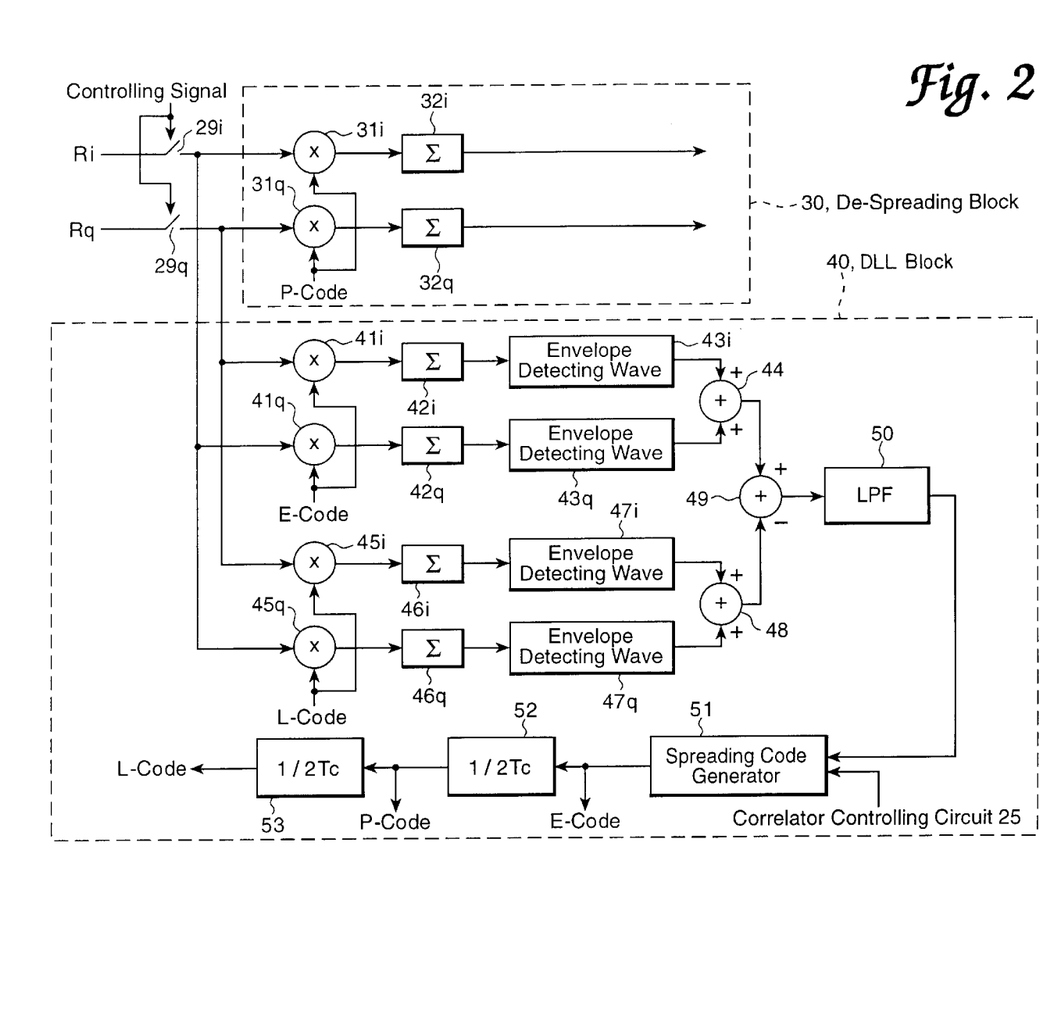
FIG. 2 shows a block diagram of a correlator of the embodiment in FIG. 1.

FIG. 2 shows a block diagram as an example of the structure of correlators 26-1 to 26-n, each of which is structured to include input signals (Ri and Rq) supply-controlling switches 29i and 29q, de-spreading block 30, and DLL block 40. "On" and "off" of switches 29i and 29q are controlled by the output of the correlator controlling circuit 25.

In the DLL block 40, 51 is a spreading code generator 51 generates a spreading code sequence with the phase designated by correlator controlling circuit 25. The spreading code sequence outputted from the spreading code generator 51 is sent to multiplication circuits 41i and 41q as an Early Code (E-Code). Circuits 41i and 41q are described later. Part 52 is a delay circuit for delaying the spreading code sequence E-Code as generated by the spreading code generator 51 by a half-chip cycle (Tc/2). The spreading code sequence output outputted from the delay circuit 52 is sent to multiplication circuits 31i and 31q as a Punctual Code (P-Code) for performing de-spreading. Circuits 31i and 31q are described later. Part 53 is a delay circuit for delaying spreading code sequence by a half-chip cycle (Tc/2), similar to the part 52. The spreading code sequence outputted from the delay circuit 53 is sent to the multiplication circuit blocks 45i and 45q as a Late Code (L-Code). Circuits 45i and 45q are described later.

From 51, 52 and 53, different spreading code sequences are outputted as E-Codes with phase Tc/2 advanced, P-Code with the correct phase, and L-Code with phase Tc/2-delayed, respectively.

In de-spreading block 30, multiplying circuits 31i and 31q multiply the received signals Ri and Rq, inputted from the P-Code, through 29i and 29q. Parts 32i and 32q are accumulators for accumulating multiplication results signals from 31*i* and 31*q* during a single cycle of spreading code sequences. Circuits 31*i*, 31*q*, 32*i* and 32*q*, perform de-spreading on received signals, and the transmitted data is demodulated.

Parts 41*i* and 41*q* are multiplication circuits for multiplying the spreading code sequence E-Code and the received signals Ri and Rq. Parts 42*i* and 42*q* are accumulators for accumulating outputs from 41*i* and 41*q* during a single cycle of spreading code sequences. Circuits 41*i*, 41*q*, 42*i* and 42*q*, calculate correlation value between (Ri and E-Code) and (Rq and E-Code). Correlation outputs from 42*i* and 42*q* are inputted into the envelope detecting circuits 43*i* and 43*q*, respectively to remove the influence of modulation on each correlation output, and then added in adder 44.

L-Code and each signal Ri and Rq are multiplied in 45*i* and 45*q*, respectively, and the multiplied results are accumulated in accumulators 46*i* and 46*q*, respectively, by a single cycle of spreading code sequences. The correlation between L-Code and each signal Ri and Rq is calculated in this way. From outputs of 46*i* and 46*q*, the influence of modulation is removed through the envelope-detecting circuits 47*i* and 47*q* to be added in addition circuit 48.

In addition circuit 49, the output of 48 is subtracted from the output of 44. Then the output of 49 is inputted into the spreading code generator 51 through low-pass filter 50 to control the phase of the spreading code generated in 51.

The output of 44, which is a correlation output of E-Code with phase advanced by Tc/2 is an output having a peak on the location with two-chip advanced phase compared with the spreading code sequences used for de-spreading on actual signals. The output of 48, which is a correlation output of L-Code with phase delayed by Tc/2, is an output having a peak on the location with half-chip delayed phase compared with the spreading code sequences used for de-spreading on actual signals. Subtracter 49 which subtracts the output of 48 from 44, has outputs with S-shaped characteristics with a positive peak on −π/2 and a negative peak on Tc/2. Therefore, by feeding back the outputs of subtracter 49 to spreading code generator 51, the phase of spreading code sequence generated in 51 is given a delay control when the output of 49 is positive, and it is given an advance control when the output of 49 is negative, so that the sequence is stable to output 0. A P-Code used for an active de-spreading can be tracked to the state synchronous to the received signal.

To perform acquisition, the circuit in FIG. 2 requires that the phase difference between the spreading sequence of a received signal and that of a receiver is within ±Tc/2 before the tracking is started. In the present invention, acquisition is performed with this accuracy by the complex matched filter 22.

In this embodiment, although the phase difference between E-Code and L-Code is Tc, it is not limited to Tc. It can be 2Tc, in which case the accuracy of the acquisition circuit of complex matched filter 22 can be made to correspond to it, that is, ±Tc.

The timing of actions of the CDMA receiver with such structure is described with reference to the timing charts in FIG. 3.

Figure 3:
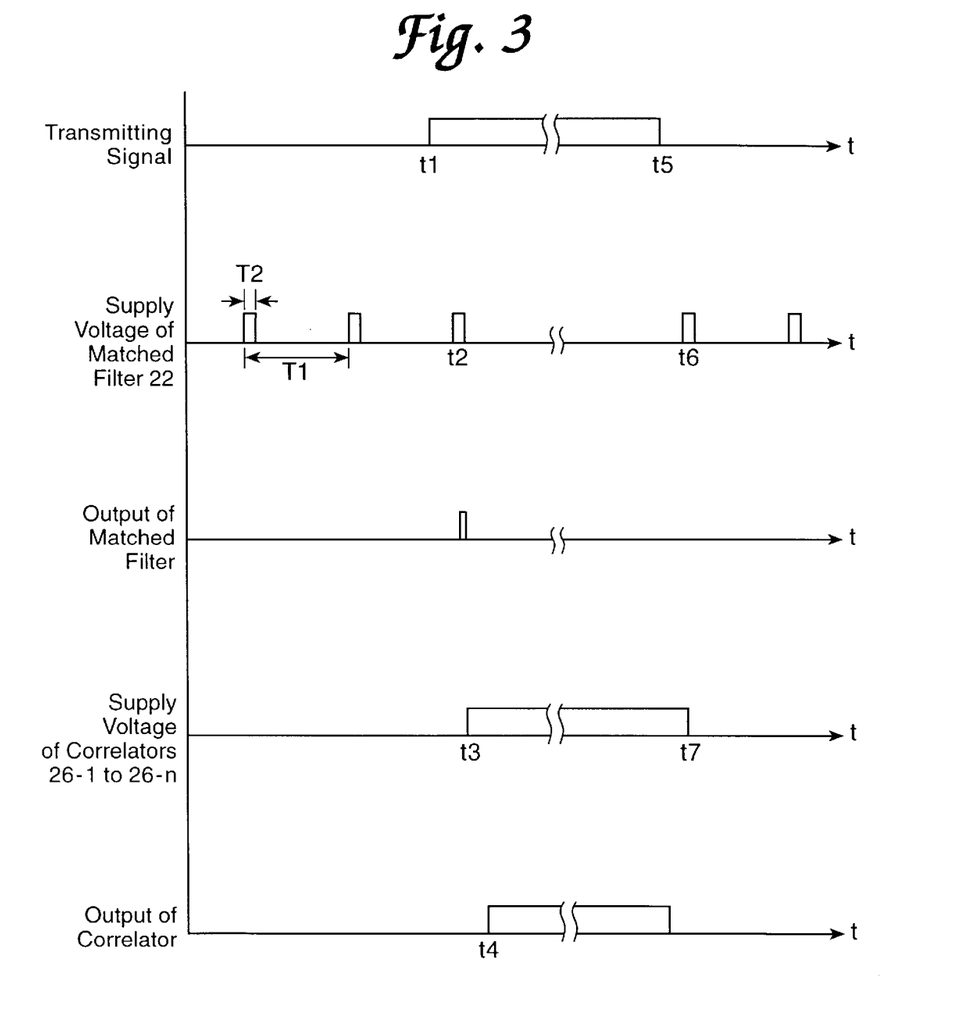
FIG. 3 shows a timing charts of actions of the receiver of FIG. 1.

In FIG. 3, (1) shows an example of the timing of signal from the transmitter, (2) shows the timing for driving complex matched filter 22 controlled by source voltage controlling circuit 20, (3) shows an example of the output timing of 22, (4) shows an example of the driving timing of correlators 26-1 to 26-*n* controlled by correlator controlling circuit 25 of this invention, and (5) shows the output timing of 26-1 to 26-*n*.

When no signal is transmitted and no signal is received, as shown in (2), the supply voltage is given to the complex matched filter 22 by the supply voltage controlling circuit 20 during the period T2 for every cycle of T1. T2 may be the period during which acquisition is performed by the matched filter. For example, when the spreading code sequence is 128 chips, the period is 128×Tc—(Time for Inputting a Received Signal to a Matched Filter). As T1, 20 or 30 msec is usually appropriate, although this can be flexible according to the situation.

In the wait mode, the matched filter is intermittently driven and the electric power consumption is minimal.

As shown in (1). when a signal arrives from the transmitter at time t1, a correlation peak output larger than the predetermined value is generated as shown in (3), because a receiving signal exists during the driving period from time t2. Correlator controlling circuit 25 works by the output, and as shown in (4), correlators 1 to n commence being fed driving voltage at time t3, and receiving signals Ri and Rq are sent to them as well. De-spreading is performed in 26-1 to 26-*n*, as described, and the output is as appears in (5).

When signal transmission is completed at time t5, de-spreading output levels 26-1 to 26-*n* are lowered as in (5). Consequently, electric power outputs emanating from electric power calculation circuits 27-1 to 27-*n* are lowered, and supply voltage controlling circuit 20 resumes its intermittent driving of the matched filter 22, as shown in (2). As there is no signal being transmitted, there is also no output from the matched filter 22, and the correlator controlling circuit 25 stops giving electric power to 26-1 to 26-*n* at time t7. Then, the circuit is again at its initial state.

Moreover, when acquisition is interrupted, for example, owing to changes in the state of radio waves while signals are being received, analogous to the completion of signal transmission, matched filter 22 intermittently works to obtain acquisition.

Acquisition by the matched complex filter 22 can be started again when the output level of one of electric power calculation circuits 27-1 to 27-*n* having the paths as above declines, or when the total output of the received electric power from 27-1 to 27-*n* is smaller than the predetermined value.

In this embodiment, though supply voltage controlling circuit 20 does not drive matched filter 22 while signals are received, it can be set to intermittently drive 22 even when signals are received, similar to the wait mode. In this case, though electric power consumption increases to some extent, the condition of path route can be intermittently observed by 22 and path-detecting circuit 24 even when signals are received, and control signals for the plurality of correlators 26-1 to 26-*n* can be renewed by the correlator controller 25. It is possible to respond to small changes in the path route status. The drive cycle of the matched filter 22 during signal reception can be longer than its drive cycle during the waiting mode. The cycle can be controlled according to the signal reception condition.

Figure 6:
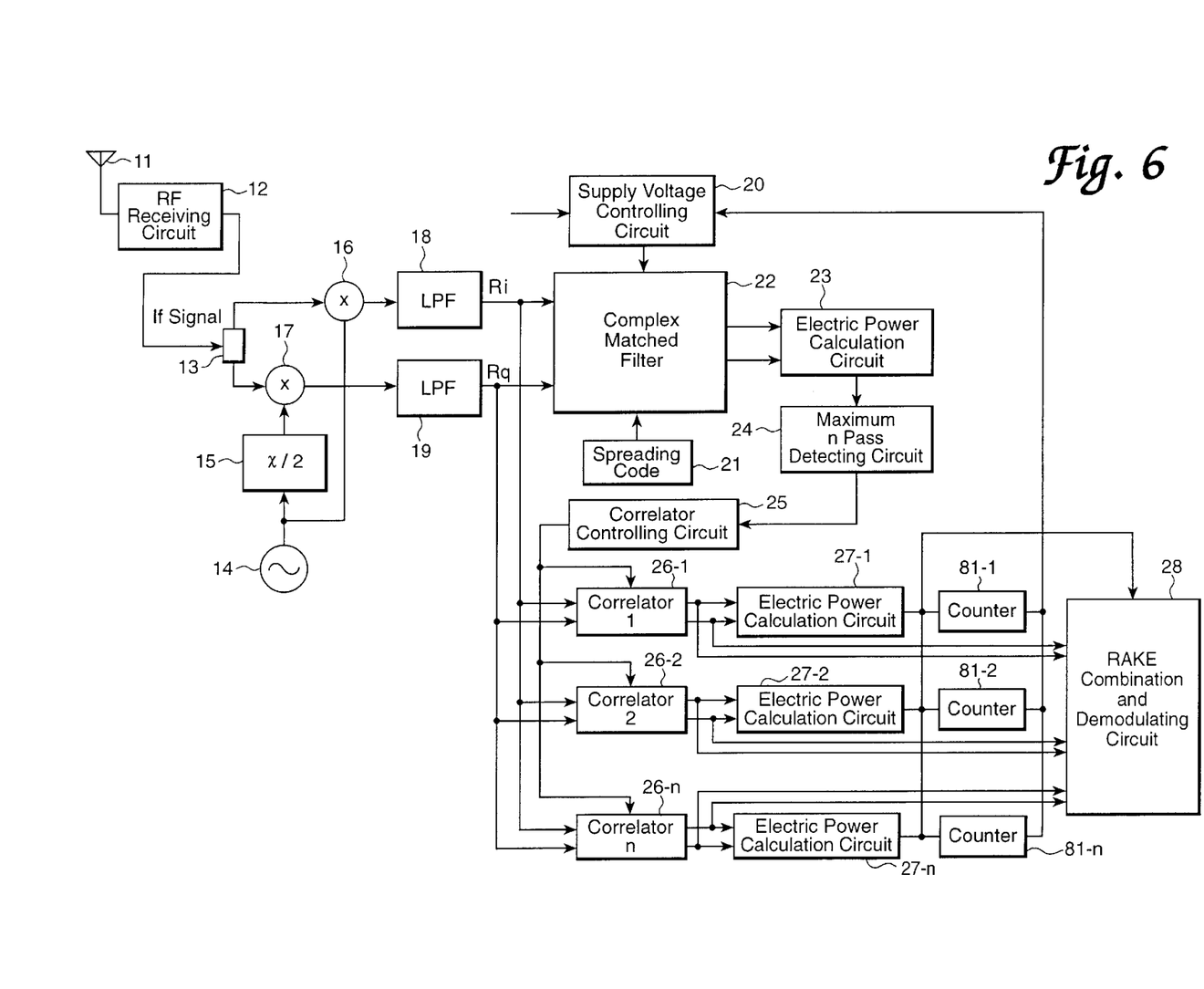
FIG. 6 shows a block diagram of another embodiment of a receiver for a CDMA communication system of the present invention.

FIG. 6 consists of the same components as those in FIG. 1, and its description is omitted. As shown, the difference is that counting circuits 81-1 to 81-*n* are respectively set just beyond the electric power calculation circuits 27-1 to 27-*n* and connected to the correlators 26-1 to 26-*n*, respectively. Counters 81-1 to 81-*n* calculate symbol clocks when the outputs of 27-1 to 27-*n* are smaller than the predetermined value, and the calculated value is reset when the outputs are larger than the predetermined value.

By setting counter circuits 81-1 to 8 1-*n,* when the received electric power level is low during any period longer than the predetermined number of symbols (10 symbol clocks for example), control signals are supplied to electric power controlling circuit 20 and acquisition is started again by the matched filter 22. On the other hand, in the embodiment in FIG. 1, as soon as electric power level is low, the matched filter 22 is driven and acquisition is started again. It is possible to prevent the start of unnecessary acquisition when receiving signals are momentarily stopped by short-time effect, strong noise, or sonic other cause.

In this embodiment, the number of symbol clocks is calculated by the counters 81-1 to 81-$n$. The calculated count is reset according to the output of 27-1 to 27-$n$. This is not an absolute structure, for other structures are feasible. For example, counting up the counters 81-1 to 81-$n$ by the peak outputs of 27-1 to 27-$n$ and counting down by the symbol clocks, acquisition by the matched filter 22 is started when the counted value is smaller than the predetermined value. Another example entails using an integral circuit instead of a counter, so that acquisition is started again when the output of the integral circuit is smaller than the predetermined value. The necessary point is that complex matched filter 22 is controlled to start work by the supply voltage control circuit 20 when electric power is low for a period longer than the predetermined period.

According to the receiver for a CDMA communicating system of the present invention, electric power consumption can be low and acquisition can soon be completed because the matched filter intermittently operates in the wait mode. Further, signals can be received in good condition by adopting a RAKE receiver.

An embodiment with low electric power consumption other than those above is now described, wherein a matched filter with low power consumption is used to further reduce such consumption. FIG. S shows the structure of this matched filter, which is one of the two same type as in complex matched filter 22. To simplify FIG. 8, the spreading code sequence is 6-bits long and has six delaying steps. However, the actual spreading code sequence is a couple of 10-bits to a couple of 100-bits long, and has delaying steps whose number corresponds to the code length.

Figure 8:
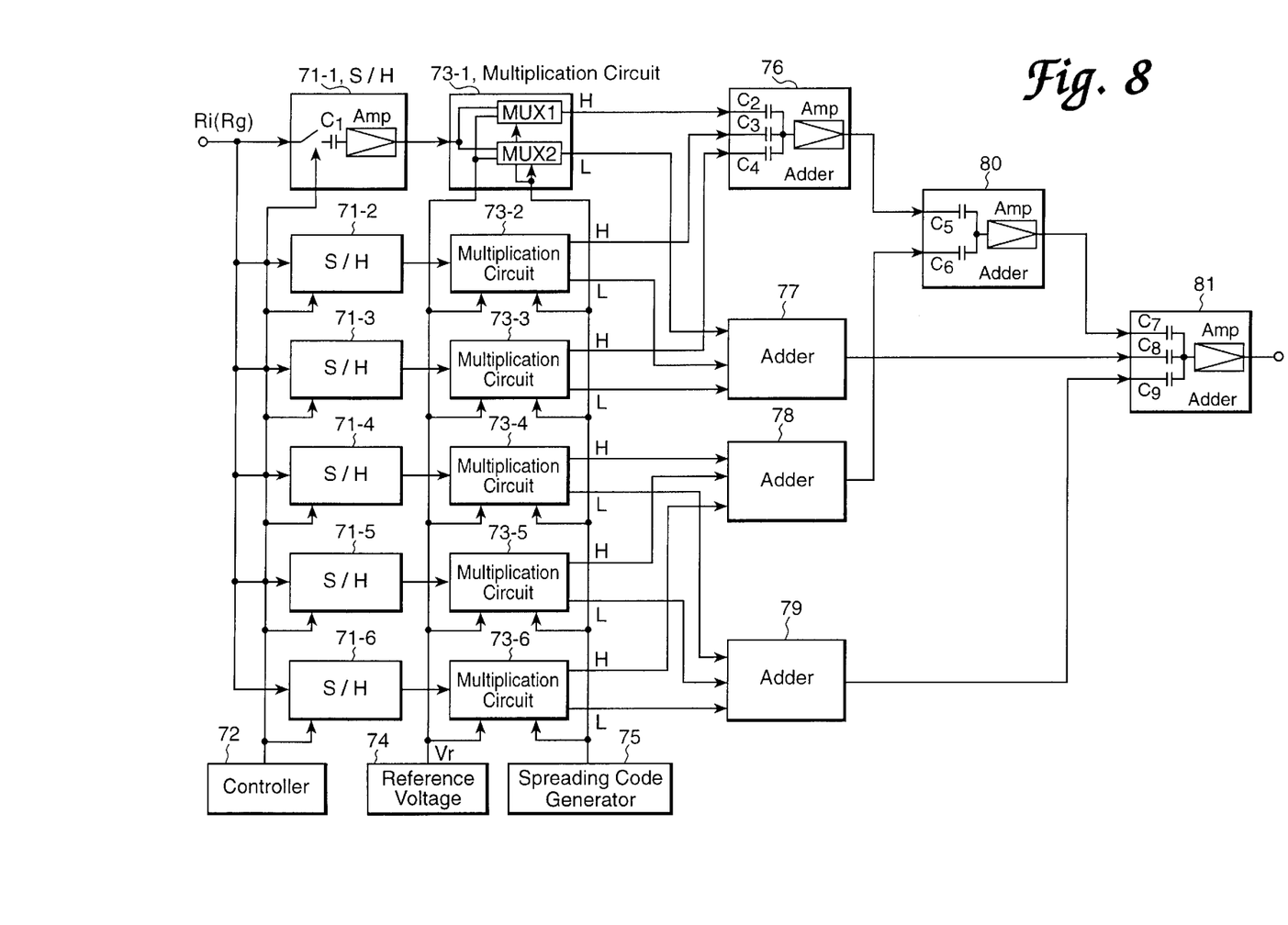
FIG. 8 shows a block diagram of a matched filter of other embodiment than in FIGS. 1 and 6.

In FIG. 8, are sampling and holding circuits 71-1 to 71-6 sample and hold signal Ri or Rq, multiplication circuits 73-1 to 73-6 multiply outputs from the sampling and holding circuits 71-1 to 71-6 and spreading codes, and the adders 76 to 81 the outputs from the multiplication circuits 73-1 to 73-6. Part 72 is the controlling circuit for controlling the sampling timing in 71-1 to 71-6. The reference voltage generating circuit 74 inputs the reference voltage to 73-1 to 73-6, and the spreading code generator 73-1 to 73-6 generates the spreading code sequence.

As shown, each sampling and holding circuit 71-1 to 71-6 includes an analog switch controlled by a controlling signal from the controller 72, capacitance C1 and inverted amplifier Amp. All of the adders 76 to 81 include capacitances, each of which is connected to a plurality of input terminals, and the inverted amplifier Amp. In each sampling and holding circuit and adder in this matched filter, a neuro-operating amplifier including capacitances connected to inputs and an amplifier is used.

Figure 9A:
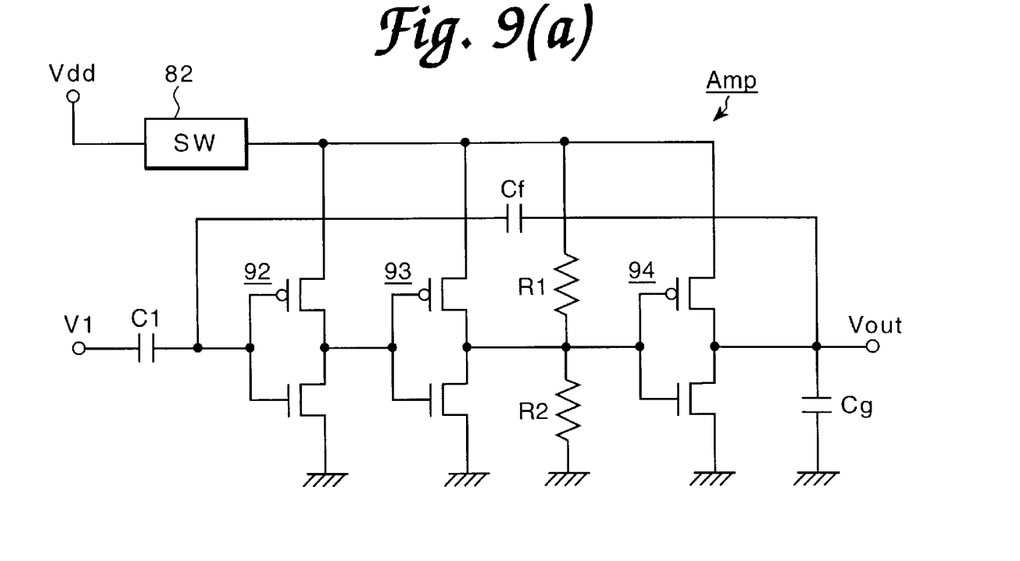
FIG. 9 shows the circuit structure of the matched filter in FIG. 8.

FIG. 9($a$) shows the structure of the Amp. In FIG. 9($a$), a switch 82 is serially connected between a supply voltage Vdd and an Amp, which is controlled by the supply voltage controlling circuit 20 as in FIGS. 1 and 6. Vi is an input terminal and Vo is an output terminal. Capacitance Cf for feeding back is set between Vi and Vo, and parts 92, 93 and 94 are CMOS inverter circuits. In Amp, an inverter is used as an amplifier when the CMOS inverter output changes from high-level to low-level or from low-level to high-level. Amp includes an odd number of stages of CMOS inverters: for example, three stages, as shown. Resistances R1 and R2 are set for controlling the gain of amplifiers, and capacitance Cg is set for adjusting the phase. They prevent oscillation within the Amp.

The action of a neuro-operating amplifier for sending the input voltage through capacitances is described with reference to FIG. 10, where the Amp is the inverted amplifier. Input voltages V1 and V2 are input to Amp through capacitances C1 and C2, respectively. As the voltage amplifying ratio of Amp is very large, the voltage on B near the input of Amp is approximately constant: this voltage is Vb. Then, B is the point connected to the gates of the transistor-structuring capacitances C1, C2 and Cf, and CMOS inverter 92. B is floating from any supply voltage.

Therefore, when the electric charge stored in each capacitance is 0 at the initial state, the total electric charge stored in each capacitance is 0 with reference to B even after V1 and V2 are sent. The equation below derives from this:

$$C1(V1-Vb)+C2(V2-Vb)|Cf(Vout-Vb)=0 \qquad (1)$$

Here, replacing input voltages V1 and V2 by the voltage with reference to Vb, and assuming that V(1)=V1-Vb, V(2)=V2-Vb, and V'out=Vout-Vb, formula (1) changed to formula (2):

$$V'out=-\{(C1/Cf)V(1)+(C2/Cf)V(2)\} \qquad (2)$$

That is, from the neuro-operating amplifier, Vout is the output with the value of Vi multiplied by Ci/Cf and summed, and with its polarity inverted: Ci/Cf is the ratio of input capacitance Ci and feedback capacitance Cf.

Figure 10:
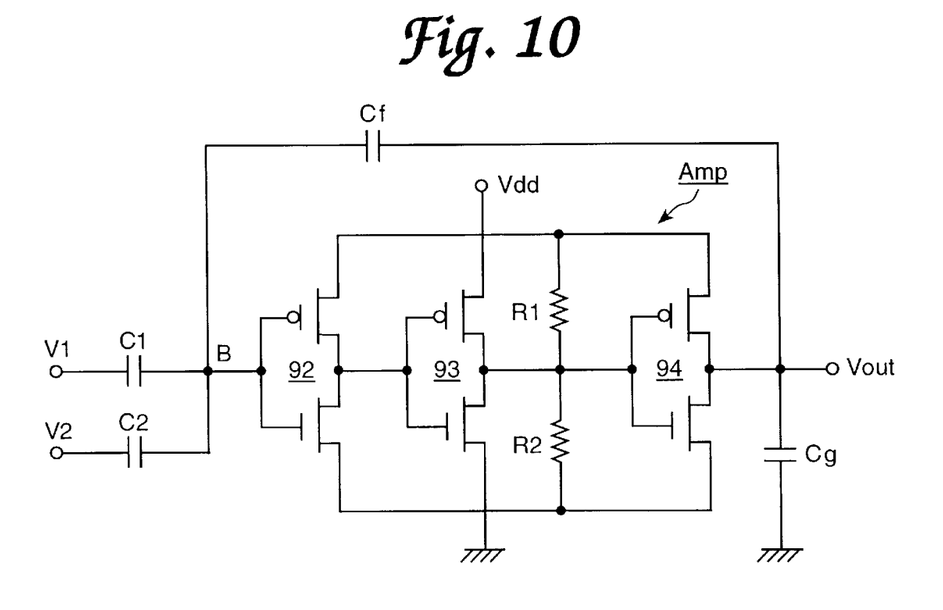
FIG. 10 shows a circuit for describing the work of the addition circuit in the matched filter in FIG. 8.

Sampling and holding circuits 71-1 to 71-$n$ are equivalent to only one input terminal in spite of there being two in FIG. 10. As the values of C1 and Cf are equally set, the output voltage is −V(1) from formula (2). That is, voltage −Ri (or −Rq) is outputted from the sampling and holding circuits 71-1 to 71-6. −Ri (or −Rq) is the voltage-inverted polarity of Ri (or Rq) when the timing input switch is opened by controller 72 in FIG. 8.

Controller 72 sends controlling signals to 71-1 to 71-6 closes analog switches in 71-1 to 71-6, and controls the input voltage received by sequentially opening switches in 71-1 to 71-6 at the timing corresponding to each chip of spread modulating signal. Consequently, a single cycle of signals of spreading code sequence are input to 71-1 to 71-6, and signals having inverted polarity are output.

Figure 9B:
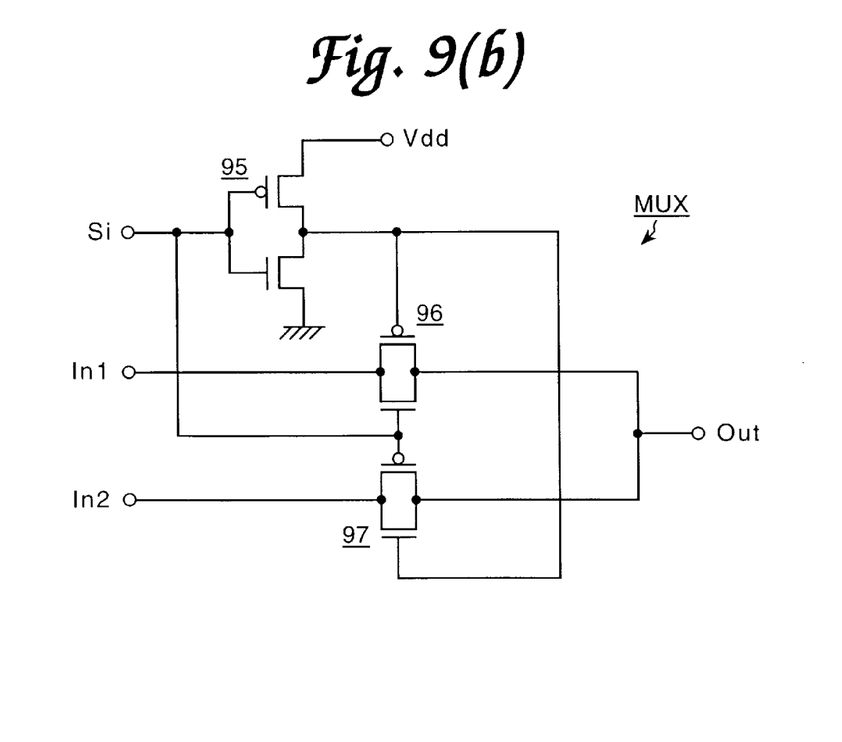

Each multiplication circuits 73-1 to 73-6 in FIG. 8 receives outputs from 71-1 to 71-6, respectively, and includes two multiplexer circuits MUX1 and MUX2 having the same structure. FIG. 9($b$) shows the structure of multiplexer circuit MUX. In FIG. 9($b$), 95 is a CMOS inverter, and 96 and 97 are CMOS transmission gates. Si is a control signal inputted terminal to which data is input with the bit corresponding to multiplication circuit 73-$i$ including MUX. The data for the input is included in the spreading code sequence outputted from spreading code generator 75. In1 and In2 are the first and second input terminals, respectively, and Out is an output terminal. In such a structure, when Si is "1" (high-level), 96 is conductive and 97 is not conductive. Consequently, the input signal from In1 is outputted at output terminal Out. On the other hand conversely, when Si is "0" (low-level), 96 is not conductive and 97 is conductive, and so the input signal from In2 is outputted at output terminal Out.

As stated, in 73-1 to 73-6, two multiplexer circuits MUX1 and MUX2 are set. The output of MUX1 is H-output of 73-$i$ and that of MUX2 is L-output of 73-$i$. To In1 of MUX1, the output voltage of Vi from corresponding sampling and holding circuit 71-$i$ is inputted, and to In2, reference voltage Vr from reference voltage generating circuit 74 is sent. To In1 and In2 of MUX2, input voltage is sent in inverse order as with the input terminals of MUX1: that is, Vr is sent to In1, and Vi is input to In2.

When the bit of Si corresponding to the spreading code sent to the control terminal is "1", the input voltage from 71-$i$ is output corresponding to H-output from MUX1, and Vr from 74 is output at L-output from MUX2. On the other hand, when Si is "0", MUX1 outputs Vr from 74 at H-output, and MUX2 outputs the input voltage from 71-$i$ corresponding to Vr at the L-output.

Figure 9C:
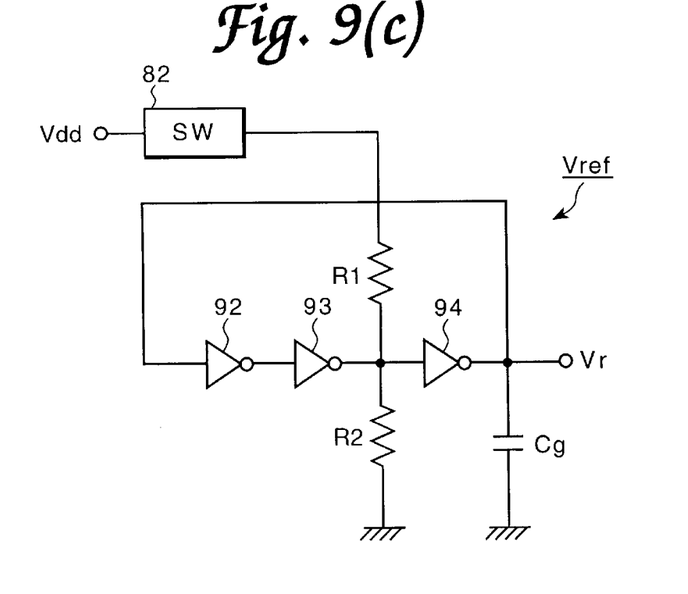

FIG. 9(c) shows reference voltage generating circuit (Vref)74. In FIG. 9(c), 92, 93 and 94 show CMOS inverter circuits similar to those in Amp in FIG. 9(a), R1 and R2 are gain controlling resistances, and Cg is a phase-adjusting capacitor. Part 82 is a switch connected among supply voltage Vdd, circuits 92 to 94, and Ri, with its conductive state controlled by supply voltage controlling circuit 20. The output voltage of the circuit converges on the stable point at which the input and output voltages are equal. The necessary reference voltage Vr can be generated by setting the thresholds of circuits 92 to 94. Here, reference voltage Vr=Vdd/2=Vb so as to increase the dynamic range. When reference voltage Vr is outputted from the H-output or L-output of the multiplication circuits 73-1 to 73-6, the input voltage V(i) in formula (2) is 0.

The output from MUX1 (H-output) in the multiplication circuits 73-1 to 73-3 is inputted into the adder 76. In the adder 76, as the value of input capacitances C2, C3 and C4 corresponding to the input voltage of 73-1 to 73-3 is equal to feedback capacitor Cf, voltage having the value of the summation of output voltages from 73-1 to 73-3 is outputted, as shown in formula (2). The polarity of the output voltage is the same as that of input voltage Ri (Rq) of the matched filter.

To adder 78, H-outputs of 73-4 to 73-6 are inputted. Similarly, the voltage having the summation of the value of the H-outputs is outputted from 78, with its polarity being the same as Ri (Rq).

Outputs from adders 76 and 78 are inputted into the adder 80. Both of the values of input capacitances C5 and C6 in the adder 80 are half of Cf. From the adder 80, the summation of half-voltage of the output of the adder 76 and that of the adder 78 is outputted. This voltage has the reverse polarity of Ri (Rq).

The output of MUX2 in 73-1 to 73-3 (L-output) is inputted into the adder 77, and the voltage having their summation value is outputted from the adder 77, similar to above. L-outputs of 73-4 to 73-6 are inputted to the adder 79 and the voltage having the value of their summation with the same polarity as Ri (Rq) is outputted.

Outputs of the adders 80, 77 and 79 are inputted to the adder 81. The size of the input capacitance C7 in the adder 81 corresponding to the input from the adder 80 is equal to that of feedback capacitance Cf, and the size of input capacitances C8 and C9 corresponding to the inputs from the adders 77 and 79 is Cf/4. Therefore, from the adder 81, the voltage corresponding to the difference between (the output voltage of the adder 80) and (the summed value of ¼ of output voltages of 77 and 79) is outputted From the adder 81, the difference voltage of the output summation of 71-1 to 71-6 supplied "1" from spreading code generator 75 and the output summation of that supplied "0" is outputted. This output is the correlation value of the spreading code sequence.

The reason why half of the input voltage is outputted from the 80 and ¼ of the output voltages from the adders 77 and 79 is outputted from the adder 81 is that the maximum voltage does not exceed the supply voltage.

After outputting the correlation value from the adder 81 in this matched filter, spreading code sequence output from the spreading code generator 75 is shifted by one chip, and operations similar to those above are performed to obtain the next correlation value. By so doing, since the signal undergoing sampling and holding need not be shifted, processing errors can therefore be prevented. By successively shifting the spreading code sequence, the acquisition above can be completed.

As computations through a neuro-operating amplifier are analog in this matched filter, circuit sizes can be remarkably reduced compared to those of digital processing.. High-speed processing is possible because parallel processing is performed. As all of the inputs and outputs in each circuit are voltage signal, very little electric power consumption is required.

The above embodiment uses signals through QPSK modulation, but other modulations such as BPSK can be adopted to this invention.

It is possible to reduce electric power consumption for signals in the wait mode of a receiver used in a CDMA communication system by the present invention. Acquisition can be completed in a short time by utilizing a matched filter.

RAKE receiving is performed by a plurality of correlators, therefore, high-quality receiving can be maintained even when multipath fading exists. As the path is detected by intermittently working a matched filter even in the wait mode, it is possible to follow changes in the transmission route.

Further, a CDMA receiver with little electric power consumption can be provided by using a matched filter including a neural element.

What is claimed is:

1. A receiver for a CDMA communication system comprising:

i) a matched filter for performing acquisition of received spread spectrum signals;

ii) a plurality of correlators parallelly set having de-spreading means and delay lock loops for acquiring both said received spread spectrum signals;

iii) a supply voltage control means for intermittently supplying voltage to said matched filter; and iv) a means for controlling the operation of said plurality of correlators according to an output of said matched filter to start said plurality of correlators when said received signals are undergoing acquisition while said matched filter works simultaneously, the phase of a spreading code sequence generated in each of said correlators according to a peak output position of said matched filter is controlled; and v) a watching means for controlling said matched filter to start a job corresponding to an output signal level from said plurality of correlators.

2. A receiver for a CDMA communication system as claimed in claim 1, wherein said watching means controls said matched filter to start the work when the electric power output from said plurality of correlator is lower than a predetermined value.

3. A receiver for a CDMA communication system as claimed in claim 2, wherein said watching means controls said matched filter to start the work when the electric power output from said plurality of correlator is lower than a predetermined value during a period longer than a predetermined one.

4. A receiver for a CDMA communication system as claimed in claim 1, wherein the cycle to supply voltage to said matched filter by said supply voltage control means is changeable.

5. A receiver for a CDMA communication system as claimed in claim 1, wherein said matched filter comprises:

i) a plurality of sampling and holding circuits;

ii) a plurality of multipliers for outputting outputs from each of said sampling and holding circuits to a first or a second output terminal according to a bit value corresponding to a spreading code sequence;

iii) a first analog signal adder for adding outputs of said first output terminal of each said multiplier;

iv) a second analog signal adder for adding outputs of said second output terminal of each said multiplier; and v) a third analog signal adder for performing subtraction between the outputs of said first and second analog addition circuits.

* * * * *